United States Patent [19]

Wuensch

[11] Patent Number: 4,457,424
[45] Date of Patent: Jul. 3, 1984

[54] APPARATUS FOR LOADING AND UNLOADING VEHICLES

[76] Inventor: Charles L. Wuensch, Rte. 1, Coon Valley, Wis. 54623

[21] Appl. No.: 289,711

[22] Filed: Aug. 3, 1981

[51] Int. Cl.³ .................... B65G 25/00; B65G 67/02
[52] U.S. Cl. ............................ 198/747; 108/53.1; 198/749; 254/281; 414/395; 414/400
[58] Field of Search ............... 414/352, 390, 395, 400, 414/402, 515, 559, 572, 585, 506, 28, 46; 198/418, 447, 448, 717, 721, 734, 736, 738, 747; 254/281, 285, 290–293; 108/53.1; 206/511

[56] References Cited

U.S. PATENT DOCUMENTS

| 766,866 | 8/1904 | Bendickson . | |
|---|---|---|---|
| 2,421,128 | 5/1947 | Pride . | |
| 2,422,910 | 6/1947 | Katinos . | |
| 2,514,752 | 7/1950 | Faulkner et al. . | |
| 2,820,560 | 1/1958 | Davis . | |
| 3,163,296 | 12/1964 | Hohnstein | 206/511 X |
| 3,186,566 | 6/1965 | Spinanger et al. . | |
| 3,361,293 | 1/1968 | Box | 206/511 |
| 3,510,107 | 5/1970 | Fidler | 254/291 X |
| 3,541,710 | 11/1970 | Sankey et al. | 254/290 X |
| 3,704,798 | 12/1972 | Carpenture et al. . | |
| 3,741,413 | 6/1973 | Friel . | |
| 3,788,500 | 1/1974 | Lemelson . | |
| 3,971,484 | 7/1976 | Anderson et al. | 414/500 |
| 4,231,004 | 3/1982 | Mills | 414/559 X |

OTHER PUBLICATIONS

*Mojoiner Stack Unloader* Brochure 10–1974 Mojoiner Bros. Co.
Copy of Blueprint and Photographs Circa 1972.

*Primary Examiner*—Robert G. Sheridan
*Attorney, Agent, or Firm*—Williamson, Bains, Moore & Hansen

[57] ABSTRACT

Apparatus for moving a load along a floor in the course of loading and unloading vehicles. The apparatus includes a pull bar movable along a floor surface, winch driven cable drums, and cable connected between the drums and the pull bar so as to provide a pair of substantially parallel cable runs extending along each side of a load to be moved. Operation of the winch moves the pull bar against a load on the floor to slide the load as desired.

The cable may comprise a single length of cable passed through rollers at the ends of the pull bar such that as the cable runs are drawn taut, the cable may run through the pulleys to automatically adjust the length of each cable run and equalize tension between the runs.

8 Claims, 9 Drawing Figures

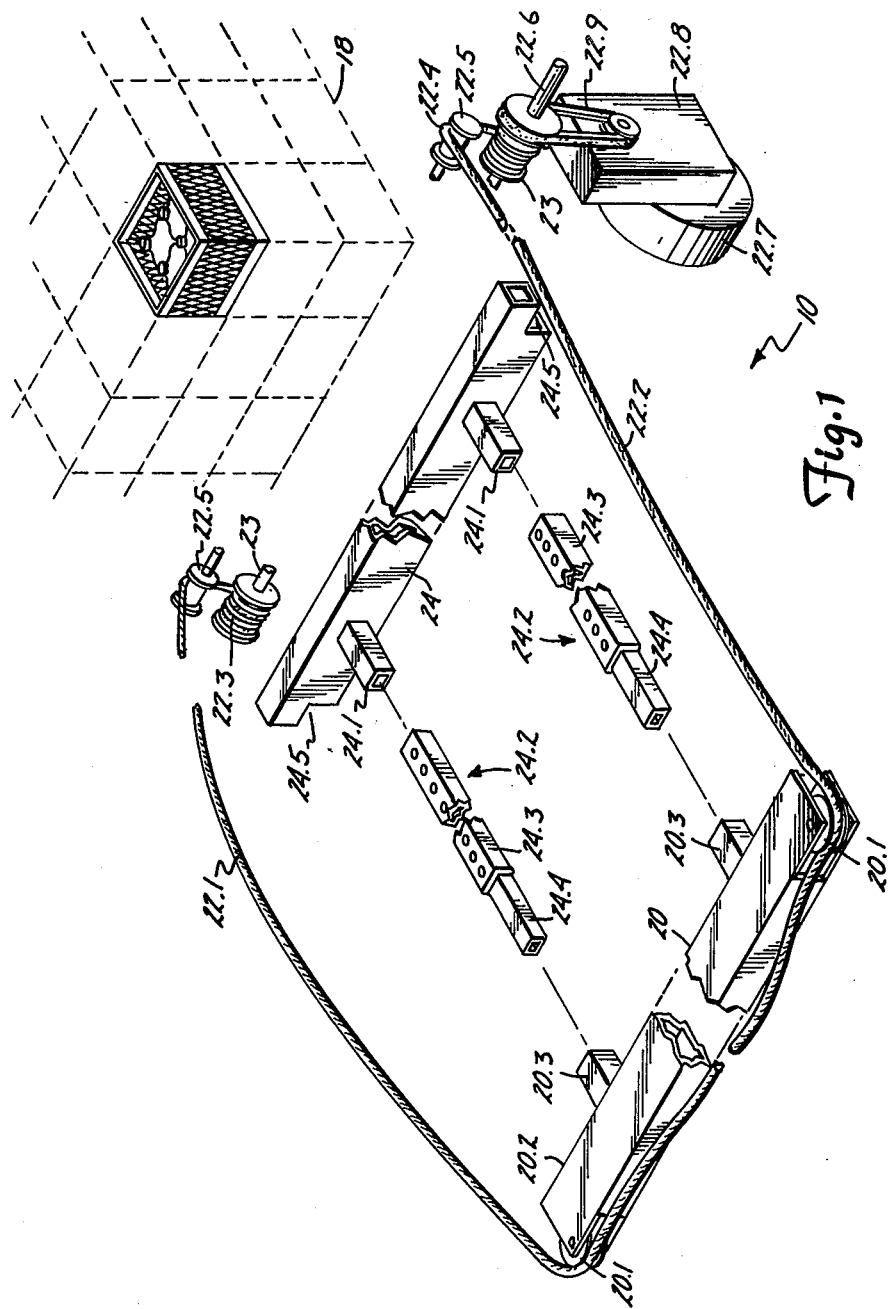

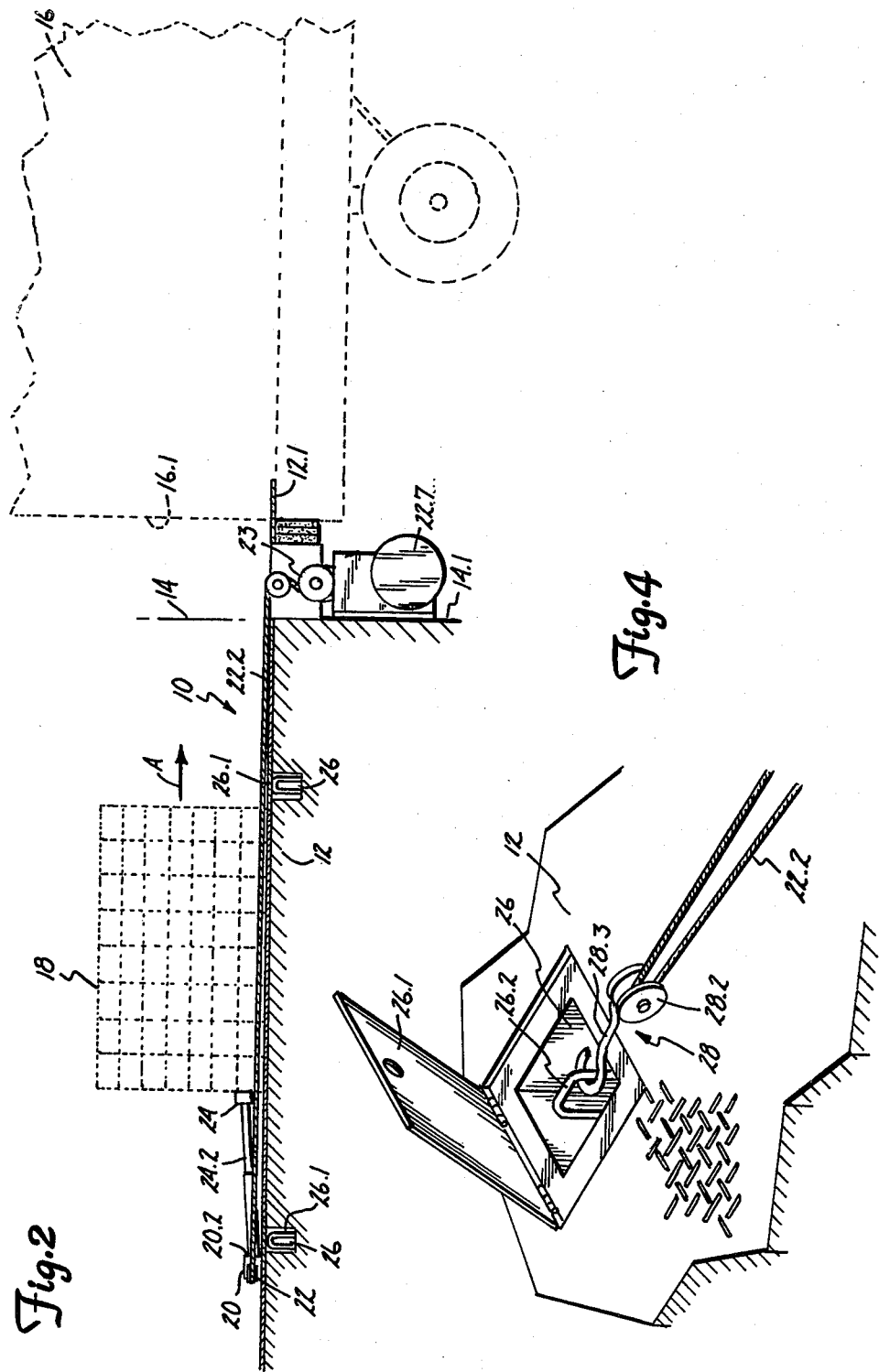

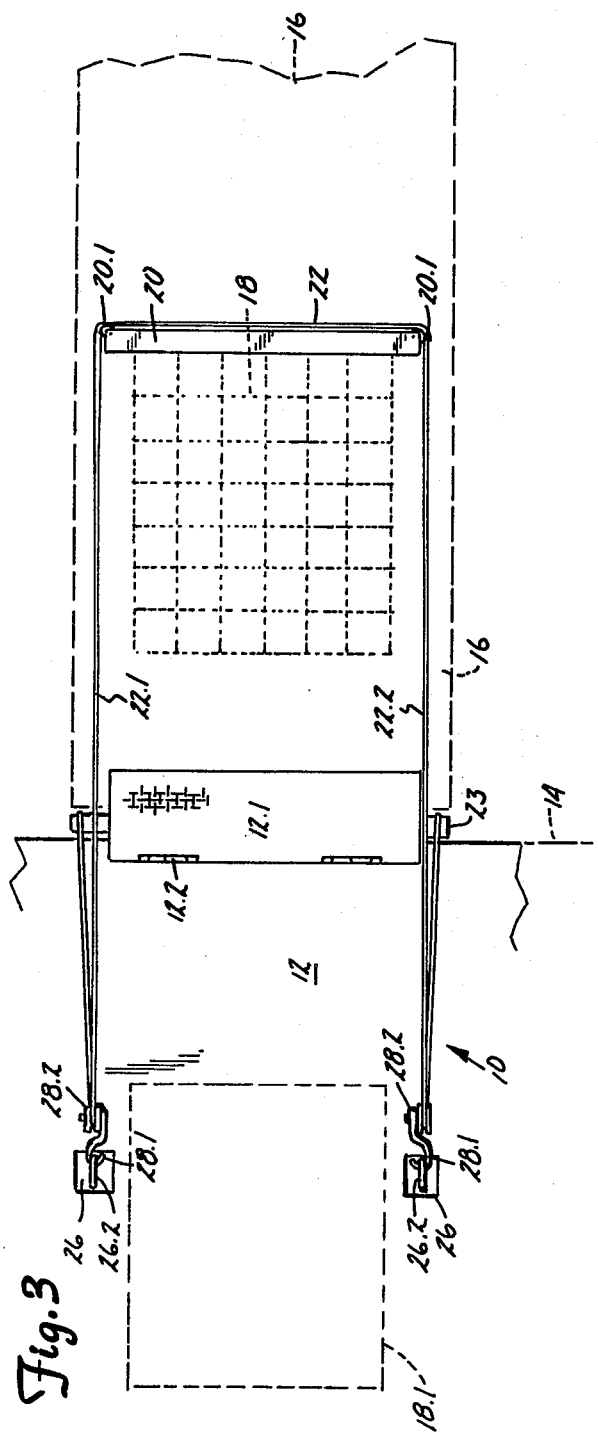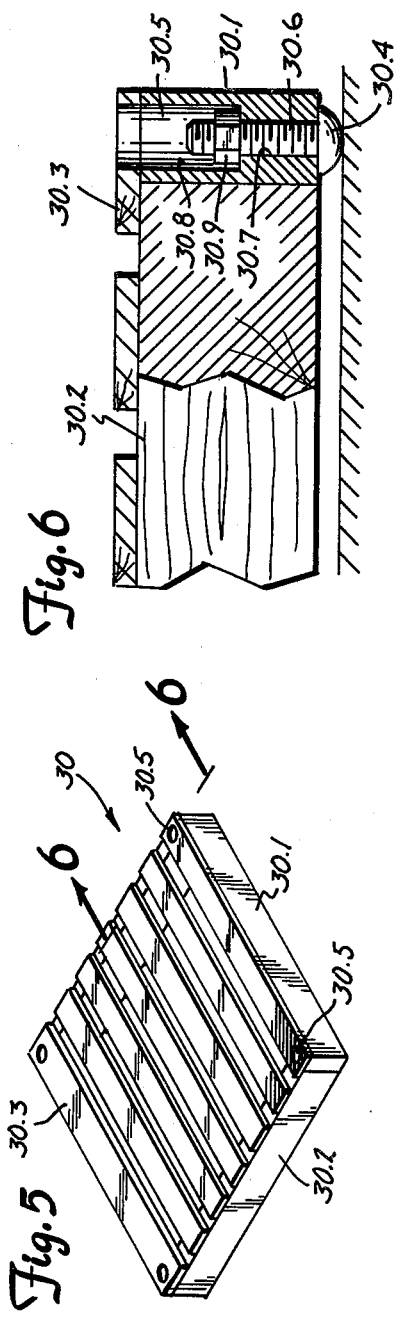

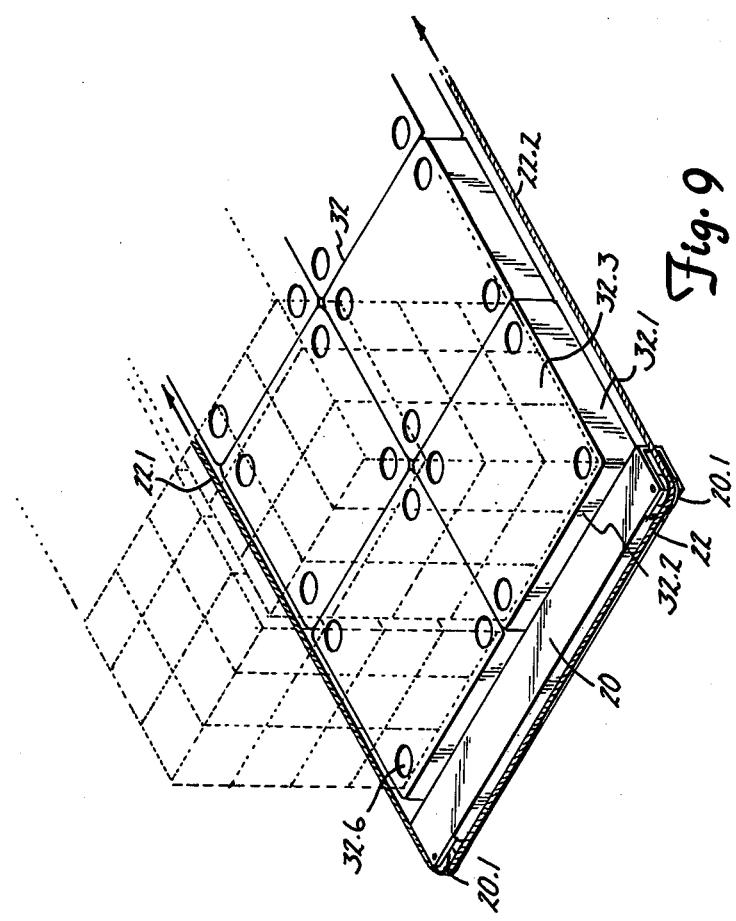
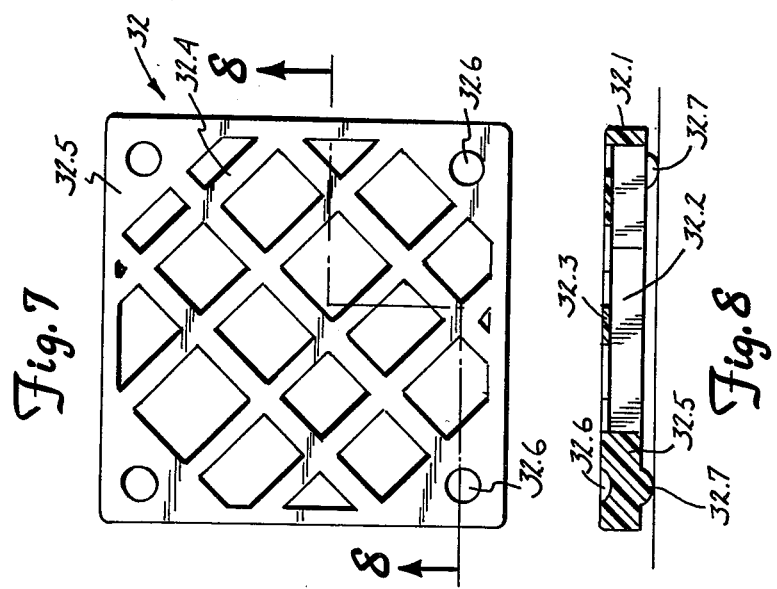

APPARATUS FOR LOADING AND UNLOADING VEHICLES

TECHNICAL FIELD

The invention relates to the field of goods handling, and particularly relates to devices for transporting loads of containers of goods into or out of vehicles such as trucks and into and out of buildings equipped with loading docks, such as dairies and supermarkets.

BACKGROUND ART

In commerce, it is often necessary to move or transport large quantities of goods into and out of transportation vehicles such as trucks. For example, in the dairy industry, large semi-trailer trucks may be backed up to the loading dock of a dairy and may be loaded with generally box-like, rectangular, basket-type containers bearing cartons of milk, butter, cheese and the like for transportation to retail stores. The containers are stacked one upon another to a heighth of, for example, five feet and are also stacked side-by-side in columns and rows. At present, it is common for one to employ a small hand truck to lift up one stack of containers at a time and transport it into or out of the truck. This procedure takes a long time, and care must be taken to precisely locate the stacks of containers in the truck so that as the truck stops at various stores, each store receives the merchandise that it had ordered. At the same time as the ordered, containerized goods are delivered, empty containers are commonly picked up by the truck.

Various devices have been devised to automatically load trucks with containerized goods. One such device is shown in U.S. Pat. No. 3,186,566, in which interlocking containers are stacked upon a sled which is then pushed by a wheeled, cable-drawn carriage into a truck. Other loading devices are shown in U.S. Pat. Nos. 2,820,560, 3,741,413, 3,704,798, 2,422,798, 2,422,910, 3,788,500, 766,866, 2,421,128 and 2,513,752. It is also known that stacks of containers, such as are used in dairies, may be pulled across the floor by a cable-drawn bar, the crates resting on a floor such as a concrete floor and the cables being attached at one end to a winch drum and at the other end to an end of the bar.

As shown in U.S. Pat. No. 3,186,566, cables or drive chains generally ride in one or more grooves formed in the floor surface, and as a result, their installation requires the expensive and time-consuming job of removing and repairing a long section of flooring to provide the slots or grooves. Further, in the event that cables attached to the ends of a bar are employed, it has been found difficult to maintain uniform tension between the two cables so that the load moves in a straight line. If one cable is slightly shorter than the other, then the load may be skewed slightly toward one side or the other of its intended path of travel, making it difficult to transport the load centrally through a dock doorway.

DISCLOSURE OF INVENTION

The invention relates to an apparatus for moving containers along a floor and through a dock doorway into or out of a truck. "Containers", as used herein, means devices in which or on which goods may be held for transportation as units. Boxes, rigid baskets and pallets are examples of containers. The containers useful in the invention are characterized by high horizontal compressive strength and rigidity.

In one embodiment, the invention provides an apparatus for slideably moving containers across a floor and through a dock doorway. This embodiment employs an elongated pull bar positionable at floor level behind the load of containers, the bar having a forward surface contactable with the containers. Winch means are carried adjacent the floor level and adjacent a dock doorway, and cable means, including a pair of cable runs, join the pull bar and winch means. Means are provided for substantially equalizing the tension, that is, the load in units of force, in the cable runs as the cable runs are placed under tension. As the winch means is driven, the cables pull the pull bar forwardly against the load of containers, correctly orienting the pull bar with respect to the path of travel of the load. As the containers are moved into position to form the load, there normally would be provided small spaces between adjoining containers in the intended direction of travel of the load. As the pull bar pulls the rearward row of containers forwardly, that row of containers comes into contact with the next row of containers and so on, the horizontal spaces between the containers in the direction of intended travel disappearing and the containers thus being moved into a "unitized" load which moves as a single unit forwardly along the path of travel and through the doors of a freight dock. The means equalizing the tension in each of the cable runs maintains the forward surface of the pull bar substantially perpendicular to the direction of travel, and the moving load is hence maintained in the intended path through the dock doorway.

In another embodiment, an apparatus is provided for sliding containers along a floor and through a dock doorway, the apparatus comprising an elongated pull bar positionable at floor level behind the containers and having a forward surface contactable substantially at floor level with the containers. Winch means are provided, including at least one powered, reversible winch drum upon which cable can be wound, the winch drum being characterized by having its upper circumferential surface positioned substantially at floor level adjacent the dock doorway. Cable means are provided to join the pull bar and the at least winch drum, the cable means including at least one cable run extending from the pull bar forwardly and over the drum, the forward end of the cable run between the pull bar and the drum thereby being maintained substantially at floor level. To pull a load of containers in the opposite direction, the end of the cable to be attached to the winch drum is passed in the opposite direction but again over the upper circumferential surface of the winch drum. This embodiment avoids the necessity of providing various pulleys to direct the cable run to the winch drum.

In another embodiment, the invention includes apparatus for moving goods through a dock doorway and generally rectangular, preferably square pallet means including at least one pallet having an upper, load-supporting surface and a plurality of downwardly extending skids providing sliding surfaces in sliding contact with the floor over which the goods are to be moved, the skids preferably being four in number and positioned adjacent corners of the pallet. An elongated pull bar is positionable behind the at least one pallet and has a forward surface contactable with the pallet. Winch means, including a powered winch drum, is positioned adjacent the dock doorway at or below floor level, and cable means, including at least one cable run, extends between and joins the pull bar and the winch drum, whereby driving the winch drum causes the pull bar to pull the at least one pallet across the floor and through the dock doorway. Desirably, the pallet is provided with a plurality of upwardly open recesses sized and oriented to receive the skids of another, identical pallet so that when empty, the pallets may be nested one on top of another to form a stable stack for shipment. The floor surface may be provided with longitudinal rail means having upwardly facing, hard, sliding surfaces over which the bottom, hard surfaces of the pallets may slide.

In the first embodiment described above, the means for substantially equalizing tension in cable runs may comprise pulleys carried adjacent the ends of the pull bar, the cable means comprising a single length of cable attached forwardly at its ends to respective winch drums and rearwardly encircling the load, the cable being trained over the pulleys so that as unequal tension builds up in the cable runs, the cable may run freely over the pulleys in response to the tension difference to equalize the tension in the cable runs.

DESCRIPTION OF THE DRAWINGS

FIG. 1 is a perspective, broken-away, diagramatic view of a device of the invention.

FIG. 2 is a side view of a device of the invention showing the same as used to load containers into a truck;

FIG. 3 is a top view of the device shown in FIG. 2;

FIG. 4 is a broken-away, perspective view of an element shown in FIGS. 2 and 3;

FIG. 5 is a perspective view of a pallet useful in the instant invention;

FIG. 6 is a cross-sectional, partially broken-away view taken along line 6—6 of FIG. 5;

FIG. 7 is a top view of another pallet useful in the invention;

FIG. 8 is a cross-sectional view taken along line 8—8 of FIG. 7; and

FIG. 9 is a perspective, partially broken-away view of a device of the invention employing the pallets of FIGS. 7 and 8.

BEST MODE FOR CARRYING OUT THE INVENTION

Referring first to FIG. 2, a device of the invention is shown generally as 10. The floor of a dairy or supermarket or other building is designated (12), the floor being of, desirably, a smooth concrete or being formed of steel and having a raised herringbone or similar surface pattern. The floor (12), as shown in FIG. 2, is generally flat and level, and terminates at a doorway indicated in dashed lines as (14) in FIG. 1. The doorway is of the type employed in dairies and other establishments, and may lead to a dock for truck loading and unloading, or may open directly into a truck loading area. A truck (16 in FIG. 2) is shown in dashed lines as having its open end (16.1) directly adjacent the dock doorway (14).

Referring now to FIG. 1, a load of containers is typified generally as (18), the containers being stacked in columns and rows so as to form a conveniently-sized and shaped load for reception in the truck (16). In FIG. 2, the load is shown in position on the floor of a building in readiness to be moved into the truck (16).

Referring now to FIG. 1, an elongated pull bar (20) is positioned to the rear of the load of containers (18), and is adapted to slide across the floor upon which it rests. The pull bar preferably is of metal, and may consist of a channel-shaped steel bar, appropriately formed as shown in FIG. 1. At its rearward corners, the pull bar (20) is provided with cable rollers (20.1), the rollers having vertical axles journaled into the walls of the channel. The forwardly-facing surface (20.2) of the pull bar may be smooth and straight for contact with the load, or may be provided with forwardly extending connector rods (20.3), the purpose of which will be explained below. A single length of cable (22) extends along the rearward edge of the pull bar, the cable being trained about the cable pulleys (20.1) at the ends of the pull bar and thence extending forwardly in cable runs designated (22.1) and (22.2). The forward cable ends (22.3, 22.4) are attached to motor-driven winch drums (23) positioned adjacent the surface of the floor (12) and adjacent the dock doorway (14). As the motor-driven winch drums (23) are rotated, the cable runs are drawn tight, thereby causing the pull bar (20) to move in a forwardly direction.

The speed of movement of the load, of course, may be varied within wide limits and depends in part upon the nature of the load to be moved. Preferably, loads are moved in accordance with the invention within a range of about five to about twenty feet per minute (about 1.5 to about 6 meters per minute).

As shown in FIG. 1, the winch drums (23) may be mounted below the level of the floor, preferably adjacent the vertical surface (14.1) of a building just outside the dock doorway. The cable runs (22.1), (22.2) may be trained over pulleys (22.5) having their upper surfaces generally aligned with the upper surface of the floor over which the load is to be moved, the cable ends extending thence downwardly and wrapping about the winch drums (23). The latter, in turn, may be driven by a drive shaft (22.6) powered by an electric motor (22.7) through a gear box (22.8) connected to the drive shaft by a drive chain (22.9). The winch drums may be equipped with key hole slots (not shown) in their circumferential surfaces to receive the ends of the cable runs, in a known manner.

It will now be understood that as the winch drums are rotated, the cable runs are placed under tension and any difference in length between the runs is automatically adjusted by movement of the cable through the pulleys (20.1), as will be explained in further detail below.

The pull bar may include spacer means to space the forward surface of the pull bar, (20) forwardly of the connection of the cable means to the pull bar, thereby permitting the load to be pushed entirely within a truck or within a building. A spacer bar is shown at (24) in FIG. 1, and comprises, desirably, a rigid metal bar, preferably hollow or in channel form, similar to the pull bar (20). Extending rearwardly from the spacer bar are connector rods (24.1) in general alignment with the connector rods (20.3) of the pull bar. A pair of spacers are shown generally as (24.2), each comprising a hollow outer bar (24.3) within which is received, in telescoping fashion, an inner bar (24.4). Matching, pin-receiving holes may be formed in the telescoping bars so that the overall length of the spacer may be adjusted as desired. The forward ends of the spacers may be adjusted as desired. The forward ends of the spacers are sufficiently large to fit over the connector rods (24.1) of the spacer bar, and the rearward ends of the spacers are adapted to be received within the connector rods (20.3) of the pull bar, thus rigidly joining the forward surface of the pull bar (20) to the spacer bar (24). The spacer bar (24) rides upon the floor, and the connector rods (24.1) desirably are attached at a level slightly above the level to which the connector rods (20.3) are attached to the elongated pull bar (20), the spacers (24.2) thus decending slightly from the spacer bar to the forward surface of the pull bar to maintain the latter on the floor as the cable runs are placed under tension. The lower surfaces of the spacer bar adjacent its ends may be recessed, as shown at (24.5) in FIG. 1, to provide space for the forward cable runs.

Referring to FIG. 2, the purpose of the spacer bar (24) and spacers (24.2) are to permit the load (18) to be moved completely through the dock doorway (14) and into the truck (16). As the pull bar (20) is moved forwardly over the winch drums (24), forward propulsion of the pull bar ceases. However, in this position, the spacer bar (24), pushing ahead of it the load, is advanced well within the truck (16). Of course, rotation of the winch drums can be stopped at any time so that the load may be correctly positioned fore and aft in the truck body.

If desired, the winch drums (23) may be positioned as shown in FIG. 2 such that the upper circumferential surfaces of the drums are substantially aligned with the upper surface of the floor (12) over which the load is to be drawn. In this embodiment, the winch drums preferably can rotate in either direction. As shown in FIG. 2, the cable runs, exemplified by cable run (22.2), pass forwardly and over the upper circumferential surfaces of the winch drums, thereby avoiding the need for additional pulleys as shown at (22.5 in FIG. 1). When, on the other hand, the load is to be drawn from a truck, the cable runs may again pass over the upper surfaces of the winch drums from the opposite direction, and the direction of rotation of the drums is reversed.

Referring now to FIGS. 1 and 2, the provision of cable rollers (20.1) at the ends of the pull bar (20), typifying means for equalizing tension in the cable runs, operates not only to equalize such tension but also to maintain the pull bar substantially perpendicular to the direction in which the load is to be moved. The cable runs (22.1, 22.2), are shown in FIG. 1 as being slack. As the cable runs are drawn taut by the winch means, the pull bar (20), (the spacer bar 24 in the embodiment depicted) comes into contact with the rearwardmost containers which, as depicted, are positioned at right angles to the direction of travel. The travel of the push bar or spacer bar is momentarily halted as the cable runs tighten, and any disparity in force between the cable runs is automatically adjusted by movement of the cable through the cable rollers (20.1). With the cable runs in their adjusted position, each cable run bearing the same load, and as the force in each cable run increases, the pull bar again advances forwardly to slide the load along the surface of the building or truck floor. In this manner, the orientation of the pull bar (and spacer bar (24) in the depicted embodiments) is substantially fixed perpendicular to the direction of travel, and the tension in the respective cable runs is equalized, all before the load is moved as a unit across the floor. Thus, the equalization of forces in the two cable runs, and the proper orientation of the pull bar (20) with respect to its intended direction of travel, occur automatically.

The floor (of the building or truck) over which the load is to be moved should be level, at least in the direction perpendicular to the path of travel, so that the load does not slide under the force of gravity, to one side or the other. If desired, guides may be carried by the floor on either side of the path of travel to restrain sideways movement of the load. Lengths of angle iron or other guide members may be fastened to the floor on either side of the load for this purpose. Also, the floor may be initially formed with guides, such as bars or strips of metal on either side, or only on the lower side, of the intended path of travel. The description herein assumes that floors are level in the direction normal to the intended path of travel.

When a load is to be withdrawn from a truck (as that shown at (16) in FIG. 2), one may insert the pull bar and cable system behind the load in the truck and pull the same from the truck. It will be evident from FIG. 2 that, in the absence of a spacer bar, the load would advance until its rearmost portion was approximately over the winch drums (24). It will be desirable in some instances to at this point install a spacer bar as described above between the pull bar and the load to permit the load to be pulled further within the dock doorway. This, however, requires some considerable time and effort. To avoid this problem, pulleys may be installed within the building into which the load is to be pulled, the pulleys being spaced on either side of the intended path of travel.

With reference to FIGS. 2, 3 and 4, the floor of the building into which the load is to be pulled may be provided with recesses (26), the recesses being covered when not in use by plates (26.1) that are flush with the surrounding floor surface. Metal shackles or staples (26.2) are rigidly fastened within the recesses, as by embedding the lower ends thereof in concrete. Removeable cable pulley means, designated generally (28) in FIG. 4, are each provided with a cable pulley (28.2) and a hook for attaching the same to a staple (26.2). The hook and pulley may be connected by means of a short length of cable (28.3). The pulley desirably is of the type that can be opened to permit the cable to be laid therein, rather than requiring the cable end to be threaded through the pulley. As noted in FIG. 4, the pulley is thus maintained approximately at the surface of the floor (12).

Operation of the foregoing embodiment can be best understood by reference to FIG. 3 in which a load of containers (18) is depicted within the body of a truck (16), the latter having its open rearward end adjacent the dock doorway (14) of a loading dock of a building such as a dairy. A metal ramp (12.1) is attached by hinges (12.2) to the floor (12) immediately inside the dock doorway, and provides a smooth, generally level surface over which the load may move.

In this embodiment, the pull bar (20) is positioned immediately behind the load (18), and the length of cable, as above explained, passes behind the pull bar and is trained about the cable rollers (20.1) at the outer, rearward ends of the pull bar. The runs of the cable (22.1, 22.2) extend forwardly through the dock doorway (14) and inwardly of the building, the cable runs being trained about the cable pulleys (28.2) and returning to the dock doorway where the ends of the cable runs are attached to the winch drums (23), as explained above. As the winch drums are rotated, the cable runs (22.1, 22.2) become taut and the force or tension therein becomes equalized, all as explained above, the pull bar (20) being aligned perpendicularly to the direction of travel of the load. The load is then moved as a unit out of the truck and generally into the position shown in dashed lines as (18.1 in FIG. 3), the load thus being moved entirely within the building.

It will be understood that the pulleys (28.2) may be positioned elsewhere within the building as desired so that the load can be moved as a unit from place to place within the building as well.

Referring now to FIGS. 5-9, a preferred embodiment of the invention employs pallets upon which containers of goods may be stacked. The pallet in FIGS. 5 and 6 is designated generally as (30), and may be made of wood or other appropriate material. The pallet includes side and end walls (30.1, 30.2), and load-bearing slats (30.3) extend along the entire length of the pallet, and the end walls are inserted between the side walls, all as shown in FIG. 5.

The pallet (30) is provided at its corners, and elsewhere as desired, with skids (30.4) along its lower surface and skid-receiving recesses (30.5) along its upper surface, as shown best in FIG. 6. A carriage bolt (30.6), having a large, rounded or hemispherical head forming the skid (30.4), is inserted through the thickness of the side wall (30.1). The side wall (30.1) is provided with pre-drilled holes, of which one, (30.7 in FIG. 6) is of a size to closely receive the shank of the carriage bolt and the other, (30.8), is formed in the side wall above and in line with the first-mentioned hole and has a diameter substantially the same as or larger than the bolt head (30.4). A nut (30.9) fastens the carriage bolt tightly in place, as shown in FIG. 6, and the upper end of the carriage bolt shank is spaced below the upper surface of the pallet. Note that the hole (30.8) passes also through the slat (30.3). In this manner, a series of pallets of the type described may be stacked and nested one upon another, the skids of each pallet nesting in the skid-receiving recesses (30.5) of the pallet immediately beneath it, and the pallets themselves forming a neat, stable stack, thus permitting the easy storage and transportation of empty pallets. The skids formed by the carriage bolt heads space the wooden portion of the pallet a short distance above the floor upon which the pallet rests, and serves as a sliding surface so that the loaded pallets can be readily moved, as will be more fully discussed below.

Another embodiment of a pallet useful in the invention is shown in FIGS. 7, 8 and 9. The pallet of this embodiment, designated generally as (32), is made substantially entirely of plastic and comprises solid side walls (32.1) and end walls (32.2) and a top support (32.3). The latter support is webbed, as shown best in FIG. 7, the webs (32.4) generally intersecting one another and being of sufficient rigidity as to avoid significant deflection when subjected to a load. Thick fillets (32.5) are formed at the corners of the pallet, and each fillet is provided adjacent its corners with upwardly facing, generally hemispherical skids (32.7) in vertical alignment with the recesses (32.6). The skids and recesses thus described are so formed as to enable the skids of one pallet to be received within the recesses of the pallet immediately beneath and thus permit the pallets to be stacked one on top of the other to form a neat, stable stack.

Referring generally to the pallets of FIGS. 5-9, inclusive, the side and end dimensions of the pallets are preferably identical, and the pallets may measure, typically, 40" or thereabouts. The floor-contacting areas of the pallets, consisting of the skids, enable the pallets to slide easily across the floor and also provide means for enabling the pallets to be stacked one atop another. Although the skids have been typified as rounded or generally hemispherical, other smoothly contoured shapes are also appropriate and may be used. The dimensions of the pallets desirably are selected so that the pallets, when formed into a load readily fitting into a truck, as shown in FIG. 9, are two abreast. The side walls of the pallets are sufficiently rigid and strong as to withstand pressure of the pull bar (20) (FIG. 9) when the latter is urged forwardly by the cable runs (22.1, 22.2). Moreover, the side walls of the pallet preferably are smooth and come into surface-to-surface contact with one another during the loading procedure. As shown in FIG. 9, the pallets in a load move as a unit into or out of a truck. Palletizing the goods to be transported, as is known, enables a load to be broken down more easily as deliveries of goods to various locations occur.

Thus, manifestly, the present invention provides a means for rapidly loading and unloading containers of goods into and out a truck from a dairy or supermarket or other building. The equipment is reasonably inexpensive, and can be rapidly installed. The invention avoids the necessity of employing tracks or rails or the like to guide containers, and in the preferred embodiment the tension in the cables and the orientation of the pull bar are automatically adjusted.

While a preferred embodiment of the present invention has been described, it should be understood that various changes, adaptations and modifications may be made therein without departing from the spirit of the invention and the scope of the appended claims.

What is claimed is:

1. Apparatus for moving a load of containers slideably along a floor in a given path of travel, and comprising:

an elongated pull bar positionable at floor level and having a forward surface contactable with the containers generally perpendicular to the path of travel, the bar having cable rollers at its ends;

winch means including a pair of powered winch drums upon which cable can be wound;

cable means comprising a length of cable passing behind the load and trained about the cable rollers and having runs extending forwardly along each side of the load, the ends of the runs being connected to the winch drums;

whereby, as the cable is wound upon the winch drums, the pull bar is contacted with and positioned against the load, the tension in the cable runs is equalized, and the load is moved as a unit across the floor.

2. Apparatus for moving a load of containers slideably along a floor in a given path of travel, and comprising:

an elongated pull bar positionable at floor level and having a forward surface contactable with the load;

cable means providing a pair of cable runs extending along the length of the load, and winch means carried adjacent the floor level, the cable runs having forward ends attached to the winch means;

means for connecting the cable means to the pull bar and for automatically adjusting the length of each cable run to equalize tension between the cable runs; and spacer means for spacing the forward load-contacting surface of the pull bar forwardly of the means for connecting the cable runs to the pull bar;

whereby driving the winch means orients the pull bar with respect to the load, equalizing tension in the cable runs, and causes the load to be drawn across the floor along the path of travel.

3. The apparatus of claim 2 wherein the spacer means comprises a spacer bar bearing said forward surface contactable with the load, and adjustable connector means spacing the spacer bar forwardly of the pull bar.

4. Apparatus for moving a load of containers slideably along a floor in a given path of travel and comprising:
- an elongated pull bar positionable at floor level and having a forward surface contactable with the load, and cable rollers carried at ends of the pull bar;
- cable means comprising a single cable length extending behind the load and trained about said cable rollers, the cable means providing a pair of cable runs extending along the length of the load, and winch means carried adjacent the floor level, the cable runs having forward ends attached to the winch means;
- whereby driving the winch means orients the pull bar with respect to the load, equalizes tension in the cable runs, and causes the load to be drawn across the floor along the path of travel.

5. Apparatus for moving a load of containers slideably along a floor in a given path of travel and comprising:
- an elongated pull bar positionable at floor level and having a forward surface contactable with the containers generally perpendicular to the path of travel;
- cable means comprising a length of cable passing behind the load and carried slideably by the pull bar, the cable means having runs extending forwardly along each side of the load;
- winch means including a pair of powered winch drums upon which cable can be wound, and to which ends of the cable runs are connected;
- whereby, as the cable is wound upon the winch drums, the pull bar is contacted with and positioned against the load, the tension in the cable runs is equalized, and the load is moved as a unit across the floor.

6. Apparatus for moving a load of containers slideably along a floor in a given path of travel comprising:
- an elongated pull bar positionable at floor level and having a forward surface contactable with the load;
- cable means providing a pair of cable runs extending the length of the load;
- winch means carried adjacent the floor level, the cable runs having forward ends attached to the winch means;
- means for connecting the cable means to the pull bar; and
- spacer means for spacing the forward, load-contacting surface of the pull bar forwardly of the means for connecting the cable runs to the pull bar, whereby driving the winch means orients the pull bar with respect to the load and causes the load to be drawn across the floor along the path of travel at a forwardly spaced location in front of the pull bar.

7. The apparatus of claim 6 wherein the spacer means comprises a spacer bar bearing said forward surface contactable with the load.

8. The apparatus of claim 7 wherein adjustable connector means extends between said spacer bar and said pull bar and is adjustable to position the spacer bar a predetermined distance in front of said pull bar.

* * * * *